P. V. CONOVER.
ELECTRO-MAGNETIC CAR-BRAKE.

No. 175,935.

Patented April 11, 1876.

WITNESSES:
E. Wolff.
John Goethals

INVENTOR:
P. V. Conover
BY
ATTORNEYS.

UNITED STATES PATENT OFFICE.

PHILIP V. CONOVER, OF KEATCHIE, LOUISIANA.

IMPROVEMENT IN ELECTRO-MAGNETIC CAR-BRAKES.

Specification forming part of Letters Patent No. 175,935, dated April 11, 1876; application filed February 5, 1876.

*To all whom it may concern:*

Be it known that I, PHILIP V. CONOVER, of Keatchie, De Soto parish, Louisiana, have invented a new and Improved Electric Car-Brake, of which the following is a specification:

My invention has reference to certain improvements in electro-magnetic car-brakes; and it consists in the employment of an electric helix and a sliding piston in connection with the ordinary car-brake mechanism, as will be hereinafter more fully described.

Figure 1:
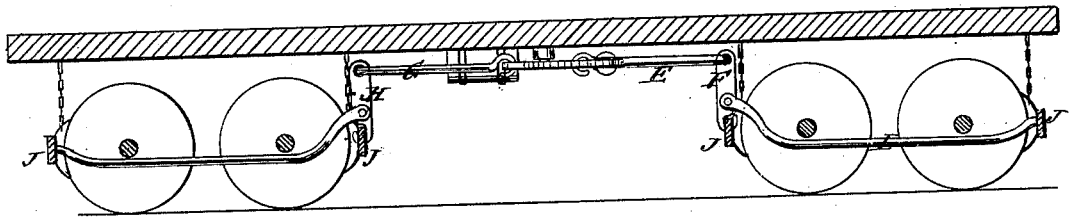
Figure 2:
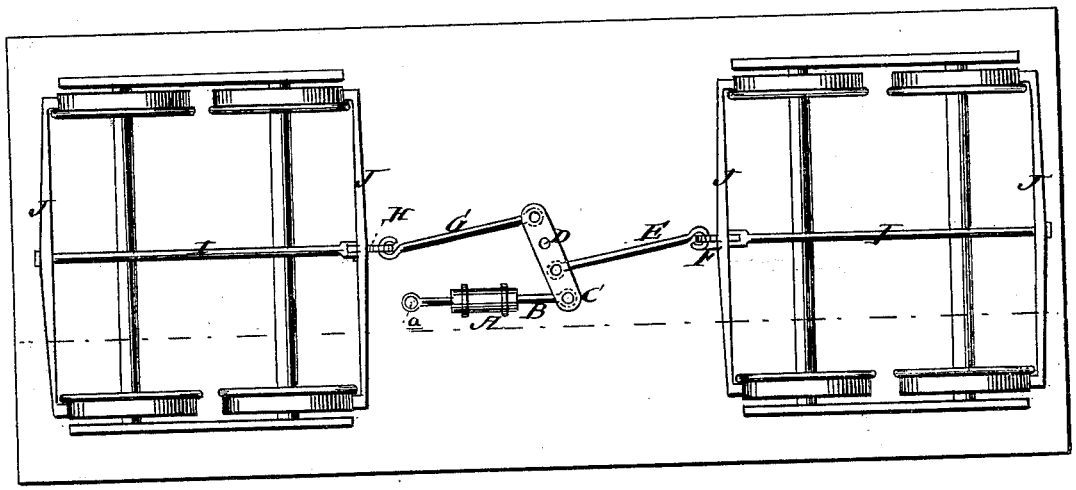

Figure 1 is a longitudinal section of a car, showing my improved brake; and Fig. 2 is a plan of the car inverted.

Similar letters of reference indicate corresponding parts.

A represents the helix, which is securely attached to the bottom of the car, and its piston B is connected to the lever C, which is pivoted at D and connected by rod E with the brake-lever F of one truck, and by the rod G with the lever H of the other truck, so that when the helix is charged the brakes will be promptly drawn against the wheels by the drawing of the piston in the helix. The rod J, connecting the front and hind brakes J of the trucks, will be bent down under the axles in the manner shown.

This brake may be worked with the single or double helix, as the case may be.

The piston of the helix is connected with the ordinary brake windlass or shaft, so as to enable the brakes to be operated by hand in the ordinary manner.

The connection with the hand-operating mechanism and the piston of the helix is made at the point $a$.

I do not desire to claim, broadly, the use of electro-magnets and armatures for operating car-brakes, but limit myself to the employment of the helix and piston, whereby the ordinary car-brake mechanism can be employed.

Having thus described my invention, I claim as new and desire to secure by Letters Patent—

In an electro-magnetic car-brake, the combination of the helix A and sliding piston B with the ordinary brake mechanism, as and for the purpose set forth.

PHILIP VORUS CONOVER.

Witnesses:
 W. S. LOGAN,
 WM. G. SPILKER.